(12) United States Patent
Martelaro et al.

(10) Patent No.: US 11,586,783 B2
(45) Date of Patent: Feb. 21, 2023

(54) INTELLIGENT DESIGN PLATFORM USING DIGITAL ASSISTANTS FOR DESIGN PROCESS SUPPORT

(71) Applicant: Accenture Global Solutions Limited, Dublin (IE)

(72) Inventors: Nikolas Martelaro, San Francisco, CA (US); Alex M. Kass, Palo Alto, CA (US); Robert P. Dooley, Dublin, CA (US); Charles Jacob Foster, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 421 days.

(21) Appl. No.: 16/880,087

(22) Filed: May 21, 2020

(65) Prior Publication Data

US 2021/0365599 A1   Nov. 25, 2021

(51) Int. Cl.
| | | |
|---|---|---|
| *G06F 30/12* | (2020.01) | |
| *G06F 30/27* | (2020.01) | |
| *G06F 30/17* | (2020.01) | |

(52) U.S. Cl.
CPC .............. *G06F 30/12* (2020.01); *G06F 30/17* (2020.01); *G06F 30/27* (2020.01)

(58) Field of Classification Search
CPC .......... G06F 30/00; G06F 30/12; G06F 30/17; G06F 30/20; G06F 2111/04; G06F 30/27
USPC .......................................................... 703/6
See application file for complete search history.

(56) References Cited

U.S. PATENT DOCUMENTS

| | | |
|---|---|---|
| 7,728,843 B2 | 6/2010 | Maillot et al. |
| 8,266,519 B2 | 9/2012 | Verma et al. |
| 8,271,870 B2 | 9/2012 | Verma et al. |
| 8,412,516 B2 | 4/2013 | Verma et al. |
| 8,442,985 B2 | 5/2013 | Verma et al. |

(Continued)

FOREIGN PATENT DOCUMENTS

| | | | | |
|---|---|---|---|---|
| CN | 103443787 | | 12/2013 | |
| CN | 107436976 A | * | 12/2017 | ............. G06F 30/17 |

(Continued)

OTHER PUBLICATIONS

Pinquie, Romain et al., "A Property Graph Data Model for a Context-Aware Design Assistant", Feb. 2020. (Year: 2020).*

(Continued)

*Primary Examiner* — Cedric Johnson
(74) *Attorney, Agent, or Firm* — Fish & Richardson P.C.

(57) ABSTRACT

Implementations for receiving, by the design assistant, an initial set of requirements, each requirement in the initial set of requirements being manually provided by a user, providing, by the design assistant and using a knowledge graph, a first set of questions based on the initial set of requirements and content determined from at least one design document in a set of design documents, filtering, by the design assistant, one or more questions from the first set of questions to provide a second set of questions, providing, by the design assistant, at least a portion of the second set of questions as output to the user to elicit one or more responses from the user, and editing, by the design assistant, the initial set of requirements based on the one or more responses to provide a set of requirements, the set of requirements for the to-be-designed product.

18 Claims, 7 Drawing Sheets

(56) References Cited

U.S. PATENT DOCUMENTS

| | | |
|---|---|---|
| 8,566,731 B2 | 10/2013 | Subramanian et al. |
| 8,671,101 B2 | 3/2014 | Verma et al. |
| 8,677,313 B2 | 3/2014 | Sharma et al. |
| 8,843,819 B2 | 9/2014 | Verma et al. |
| 9,015,011 B2 | 4/2015 | Sarkar et al. |
| 9,183,194 B2 | 11/2015 | Verma et al. |
| 9,384,187 B2 | 7/2016 | Verma et al. |
| 9,400,778 B2 | 7/2016 | Ramani et al. |
| 9,519,986 B1 | 12/2016 | Kolliopoulos et al. |
| 9,535,982 B2 | 1/2017 | Verma et al. |
| 10,535,164 B2 | 1/2020 | Shlens et al. |
| 10,769,764 B2 | 9/2020 | Fang et al. |
| 10,950,021 B2 | 3/2021 | Dubev et al. |
| 11,074,532 B1 | 7/2021 | Kennell et al. |
| 11,244,484 B2 | 2/2022 | Dubey et al. |
| 11,455,552 B2 | 9/2022 | Liongosari et al. |
| 2006/0173874 A1 | 8/2006 | Chen et al. |
| 2014/0351694 A1 | 11/2014 | Verma et al. |
| 2016/0300252 A1 | 10/2016 | Frank et al. |
| 2017/0076179 A1 | 3/2017 | Martineau et al. |
| 2017/0116373 A1 | 4/2017 | Ginsburg et al. |
| 2018/0075104 A1 | 3/2018 | Oberbreckling et al. |
| 2018/0075602 A1 | 3/2018 | Shen et al. |
| 2018/0082715 A1 | 3/2018 | Rymkowski et al. |
| 2018/0146257 A1 | 5/2018 | Seo et al. |
| 2019/0114699 A1 | 4/2019 | Cook et al. |
| 2019/0228587 A1 | 7/2019 | Mordvintsev et al. |
| 2019/0236814 A1 | 8/2019 | Shlens et al. |
| 2019/0244329 A1 | 8/2019 | Li et al. |
| 2019/0251616 A1 | 8/2019 | Yankovich et al. |
| 2019/0259470 A1 | 8/2019 | Olafson et al. |
| 2019/0318222 A1 | 10/2019 | Mallela |
| 2019/0325008 A1 | 10/2019 | Dubey et al. |
| 2019/0325088 A1 | 10/2019 | Dubey et al. |
| 2019/0325628 A1 | 10/2019 | Dubey et al. |
| 2019/0392192 A1 | 12/2019 | Dubey et al. |
| 2020/0082578 A1 | 3/2020 | Shlens et al. |
| 2020/0090318 A1 | 3/2020 | Azoulay et al. |
| 2020/0117348 A1 | 4/2020 | Jang et al. |
| 2020/0151521 A1 | 5/2020 | Almazan et al. |
| 2020/0193222 A1 | 6/2020 | Singh et al. |
| 2020/0219111 A1 | 7/2020 | Nair et al. |
| 2020/0226651 A1 | 7/2020 | Rachidi et al. |
| 2020/0242111 A1 | 7/2020 | Oberbreckling et al. |
| 2020/0250557 A1 | 8/2020 | Kishimoto et al. |
| 2020/0312042 A1 | 10/2020 | Sardari et al. |
| 2020/0365239 A1 | 11/2020 | Sabharwal et al. |
| 2021/0142478 A1 | 5/2021 | Abhinav et al. |
| 2021/0158180 A1 | 5/2021 | Liongosari et al. |
| 2021/0319039 A1 | 10/2021 | Gerber, Jr. et al. |
| 2021/0319173 A1 | 10/2021 | Gerber, Jr. et al. |
| 2021/0365488 A1* | 11/2021 | Chen .................... G06F 16/367 |
| 2022/0245510 A1 | 8/2022 | Abhinav et al. |
| 2022/0245908 A1 | 8/2022 | Abhinav et al. |

FOREIGN PATENT DOCUMENTS

| | | |
|---|---|---|
| EP | 2081118 | 7/2009 |
| EP | 2296094 | 3/2011 |
| EP | 2362333 | 8/2011 |
| WO | WO 2012106133 | 8/2012 |

OTHER PUBLICATIONS

Yan, Hehua et al., "KnowIME: A System to Construct a Knowledge Graph for Intelligent Manufacturing Equipment", Mar. 11, 2020, Advances in Machine Learning and Cognitive Computing for Industry Applications, IEEE Access. (Year: 2020).*

Princeton.edu [online], "Princeton ModelNet," available on or before Mar. 9, 2015 via Internet Archive: Wayback Machine URL<https://web.archive.org/web/20150309054238/https://modelnet.cs.princeton.edu/download.html>, retrieved on Nov. 6, 2020, retrieved from URL<https://modelnet.cs.princeton.edu/download.html>, 3 pages.

Wu et al., "3D ShapeNets: A Deep Representation for Volumetric Shapes," Proceedings of the 2015 IEEE Conference on Computer Vision and Pattern Recognition (CPVR), Jun. 7-12, 2015, Boston, Massachusetts, USA, 1912-1920.

Pham et al., "SceneCut: Joint Geometric and Object Segmentation for Indoor Scenes", May 24, 2018, arXiv:1709.07158v2, 8 pages.

Ahmed et al., "EPN: Edge-Aware PointNet for Object Recognition form Multi-View 2.5D Point Clouds," Proceedings of the IEEE/RSJ International Conference on Intelligent Robots and Systems, Nov. 3-8, 2019, Macau, China, 7 pages.

Chang et al., "ShapeNet: An Information-Rich 3D Model Repository," arXiv, Dec. 9, 2015, arXiv:1512.03012v1, 11 pages.

He et al., "GeoNet: Deep Geodesic Networks for Point Cloud Analysis," arXiv, Jan. 3, 2019, arXiv:1901.00680v1, 11 pages.

Mazeika et al., "Towards 3D Neural Style Transfer," Proceedings of the AAAI Conference on Artificial Intelligence and Interactive Digital Entertainment, Nov. 13-17, 2018, Edmonton, Alberta, Canada, 7 pages.

PointClouds.org [online], "pcl::StatisticalOutlierRemoval < PointT > Class Template Reference," available on or before Aug. 8, 2020, via Internet Archive: Wayback Machine URL<https://web.archive.org/web/20200808065826/https://pointclouds.org/documentation/classpcl_1_1_statistical_outlier_removal.html>, retrieved on Feb. 4, 2021, retrieved from URL<https://pointclouds.org/documentation/classpcl_1_1_statistical_outlier_removal.html>, 7 pages.

PointClouds.org [online], "radius_outlier_removal.h," upon information and belief, available no later than Dec. 17, 2020, retrieved on Feb. 4, 2021, retrieved from URL<https://pointclouds.org/documentation/radius_outlier_removal_8h_source.html>, 5 pages.

Qi et al., "PointNet ++: Deep Hierarchical Feature Learning on Point Sets in a Metric Space," arXiv, Jun. 7, 2017, arXiv:1706.02413v1, 14 pages.

Feng et al., "MeshNet: Mesh Neural Network for 3D Shape Representation," arXiv, Nov. 28, 2018, arXiv:1811.11424v1, 9 pages.

Gatys et al., "A Neural Algorithm of Artistic Style," arXiv, Aug. 26, 2015, arXiv:1508.06576v1, 16 pages.

Hanocka et al., "MeshCNN: A Network with an Edge," ACM Trans. Graphics, Feb. 2019, 1(1):90, 12 pages.

Mo et al., "PartNet: A Large-scale Benchmark for Fine-grained and Hierarchical Part-level 3D Object Understanding," Proceedings of the 2019 IEEE/CVF Conference on Computer Vision and Pattern Recognition (CPVR), Jun. 16-20, 2019, Long Beach, California, USA, 909-918.

Qi et al., "PointNet: Deep Learning on Point Sets for 3D Classification and Segmentation," arXiv, Apr. 10, 2017, arXiv:1612.00593v2, 19 pages.

Szegedy et al., "Going deeper with convolutions," arXiv, Sep. 17, 2014, arXiv:1409.4842v1, 12 pages.

Szegedy et al., "Inception-v4, Inception-ResNet and the Impact of Residual Connections on Learning," arXiv, Aug. 23, 2016, arXiv:1602.07261v2, 12 pages.

Szegedy et al., "Rethinking the Inception Architecture for Computer Vision," arXiv, Dec. 11, 2015, arXiv:1512.00567v3, 10 pages.

Li et al., "A closed-form solution to photorealistic image stylization," The European Conference on Computer Vision (ECCV), Munich, Germany, Sep. 8-14, 2018, 23 pages.

Anny Yuniarti, Nanik Suciati, "A Review of Deep Learning Techniques for 3D Reconstruction of 2D Images", 2019, IEEE (Year: 2019).

* cited by examiner

Design Specification Sheet 500

Purpose

Lorem ipsum dolor sit amet, consectetur adipiscing elit, sed do eiusmod tempor incididunt ut labore et dolore magna aliqua. Semper quis lectus nulla reusable and sustainable. Mi ipsum faucibus vitae aliquet nec ullamcorper sit amet risus. Pellentesque nec nam aliquam sem. Aliquam nulla facilisi cras fermentum. Maecenas accumsan lacus vel facilisis.  ⟵ 506

Scope

Amet consectetur adipiscing elit ut aliquam purus sit. Convallis aenean et tortor at risus viverra adipiscing at in. Amet volutpat consequat mauris nunc congue nisi. Molestie ac feugiat sed lectus vestibulum. Et ultrices neque augue interdum velit euismod in. Neque gravida in fermentum reusable and sustainable. Et ultrices neque ornare aenean any type of drink. Duis ultricies lacus sed turpis tincidunt id aliquet risus feugiat. Sapien pellentesque habitant morbi tristique senectus et.  ⟵ 506
⟵ 508

Requirements

Lorem ipsum dolor sit amet, consectetur adipiscing elit, sed do eiusmod tempor volutpat consequat mauris nunc congue nisi. Mi ipsum faucibus vitae aliquet nec ullamcorper sit amet risus:

- Cup should be configured such that it can be held with one hand.
- Weight should be no more than 16 ounces.
- Capacity of at least 24 fl. oz.
- Comfortable to hold with contents.
- Have a modern design.

⟵ 510

Testing

---

Questions 502

What material should the cup be made of?  
[            ]

What will the contents of the cup be?  
[            ]

Is comfort in terms of temperature and/or another parameter?  
[            ]

What are some adjectives that describe "modern design"?  
[            ]

(Submit)

INTELLIGENT DESIGN PLATFORM USING DIGITAL ASSISTANTS FOR DESIGN PROCESS SUPPORT

BACKGROUND

Product lifecycles can include multiple processes. Example processes can include, without limitation, a design process, a testing process, and a production process. Each process can include one or more phases. For example, an example design process can include a requirements phase, a design phase, an evaluation phase, and a prototyping phase.

In the design phase, a product is designed. Example products can include individual objects (e.g., cup, chair, couch, table) and spaces (e.g., room, vehicle interior). Designs can include wholly original designs, combinations of existing designs, and derivatives of existing designs. In modern design processes, much of the design process is performed using computers and design information stored as data (e.g., multi-dimensional models, images). For example, a designer can use computer-executable design tools to generate designs represented in digital files (e.g., model files, image files).

In the requirements phase of the design process, requirements of the to-be-designed product are defined. Typically, requirements are defined by the designer based on the intended use of the product and the designer's personal knowledge and/or experience of actual production and/or use of the product. Requirements can include, for example, size, weight, capacity, materials, and the like. However, other than the designer's personal knowledge and/or experience requirements capturing real-world use and context of use are absent from the design process. Further, designer-provided requirements can be insufficient in terms of specificity and/or completeness resulting in inefficiencies in the design process.

SUMMARY

Implementations of the present disclosure are generally directed to an intelligent design platform that uses digital assistants for design process support. More particularly, implementations of the present disclosure are directed to an intelligent design platform that includes a digital assistant for eliciting requirements for a to-be-designed product. In some examples, the intelligent design platform generates one or more product designs based on requirements elicited by the digital assistant of the present disclosure.

In some implementations, actions include receiving, by the design assistant, an initial set of requirements, each requirement in the initial set of requirements being manually provided by a user, providing, by the design assistant and using a knowledge graph, a first set of questions based on the initial set of requirements and content determined from at least one design document in a set of design documents, filtering, by the design assistant, one or more questions from the first set of questions to provide a second set of questions, providing, by the design assistant, at least a portion of the second set of questions as output to the user to elicit one or more responses from the user, and editing, by the design assistant, the initial set of requirements based on the one or more responses to provide a set of requirements, the set of requirements for the to-be-designed product. Other implementations include corresponding systems, apparatus, and computer programs, configured to perform the actions of the methods, encoded on computer storage devices.

These and other implementations can each optionally include one or more of the following features: actions further include receiving at least a portion of the knowledge graph in response to querying the knowledge graph using at least one query parameter associated with the to-be-designed product; filtering, by the design assistant, one or more questions from the first set of questions to provide the second set of questions includes comparing utility scores of respective questions in the first set of questions to a threshold utility score, and including a questions having a utility score that meets the threshold utility score in the second set of question; each utility score is based on a respective sub-set of scores and represents an overall relevance of a respective question to the to-be-designed product and an iteration of requirements elicitation; actions further include receiving a set of design dimensions comprising at least one design dimension, wherein the first set of questions is provided based on the set of design dimensions; multiple iterations of requirements elicitation are performed to provide the set of requirements; and actions further include receiving the set of design documents including at least one document that includes content manually provided by the user, wherein requirements in the initial set of requirements are provided from the set of design documents.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 5 depicts example requirements elicitation in accordance with implementations of the present disclosure.

DETAILED DESCRIPTION

Implementations of the present disclosure are generally directed to an intelligent design platform that uses digital assistants for design process support. More particularly, implementations of the present disclosure are directed to an intelligent design platform that includes a digital assistant for eliciting requirements. In some examples, and as described in further detail herein, the intelligent design platform of the present disclosure receives an initial set of requirements and a set of requirements is provided based on the initial set of requirements. For example, the intelligent design platform improves one or more requirements of the initial set of requirements in terms of completeness and precision to provide the set of requirements. Completeness can refer to identifying requirements that had are not specified in the initial set of requirements. Precision can refer to improving requirements with additional information. One or more product designs can be generated based on the requirements in the set of requirements.

In some implementations, actions include receiving, by the design assistant, an initial set of requirements, each requirement in the initial set of requirements being manually provided by a user, providing, by the design assistant and using a knowledge graph, a first set of questions based on the initial set of requirements and content determined from at least one design document in a set of design documents, filtering, by the design assistant, one or more questions from the first set of questions to provide a second set of questions, providing, by the design assistant, at least a portion of the second set of questions as output to the user to elicit one or more responses from the user, and editing, by the design assistant, the initial set of requirements based on the one or more responses to provide a set of requirements, the set of requirements for the to-be-designed product.

As described herein, implementations of the present disclosure automate part of a design process, namely defining requirements in a requirements phase of the design process. Existing approaches to the requirements phase are manual and rely on the designers' personal knowledge and/or experience of actual production and/or use of the product. Consequently, existing approaches are very tedious and time consuming, as well as inaccurate and often, incomplete. For example, the requirements resulting from existing approaches are limited by the designers' personal knowledge, which may be insufficient to provide complete and precise requirements. This results in overall inefficiency in the design process and inefficiencies in technical resources expended. For example, and as introduced above, the design process can be iterative, in which a design is created, evaluated, and additional iterations may be required, if the design does not meet needs for which the design is to fulfill. The needs are provided in terms of requirements. Accordingly, if the requirements defined at the outset of the design process are incomplete and/or imprecise, more iterations of the design process will be required. This itself is not only tedious and time-consuming, it also consumes technical resources in terms of the computing resources (e.g., processing power, memory) expended to generate designs.

In view of this, implementations of the present disclosure provide for computer-assisted determination of a set of requirements for a design, the set of requirements being more complete and precise than achieved using existing approaches. Implementations of the present disclosure further provide for automation of requirements elicitation that has not existed in previous approaches to product design. Further, implementations of the present disclosure can reduce a number of iterations of the design process, thereby providing technical efficiencies in terms of resources (e.g., computing resources, such as processors, memory) expended during the design process. At a higher level, implementations of the present disclosure provide a computer-implemented design assistant that provides elicitation of requirements not previously achievable in existing approaches.

To provide context for implementations of the present disclosure, and as introduced above, a product lifecycle can include multiple processes. Example processes can include, without limitation, a design process, a testing process, and a production process. Each process can include one or more phases. For example, an example design process can include a requirements phase, a design phase, an evaluation phase, and a prototyping phase. In some examples, the requirements phase includes provision of a high-level outline (e.g., notes, sketches) of the product including requirements (e.g., expected features, functions, and the like). In some examples, the design phase can include producing a product design based on the requirements. For example, modeling tools (e.g., Creo, AutoCAD, Catia, SolidWorks, Onshape) to produce computer-implemented models (e.g., 2D/3D models) of the product. In some examples, the evaluation phase can include evaluating the product model (e.g., FEA, CFD, MBD, structural analysis, thermal analysis, stability analysis) using evaluation tools (e.g., Ansys, Hypermesh, Hyperworks) to identify strengths/weaknesses, and/or whether the product model meets the requirements. In some examples, the prototyping phase includes producing a physical prototype of the product based on the product design. For example, the product model is converted to code for CNC machining, and/or 3D using one or more prototyping tools (e.g., Creo, DellCAM, MasterCAM).

In the requirements phase of the design process, requirements of the to-be-designed product are defined. Typically, requirements are defined by the designer based on the manufacturability and/or intended use of the product and the designer's personal knowledge and/or experience of actual manufacturability and/or use of the product. Requirements can include, for example, size, weight, capacity, materials, and the like. However, other than the designer's personal knowledge and/or experience, requirements representing real-world use and context of use of a product, which can collectively be referred to as industrialized context, are absent from the design process.

Implementations of the present disclosure are generally directed to an intelligent design platform that uses digital assistants for design process support. More particularly, implementations of the present disclosure are directed to an intelligent design platform that includes a digital assistant for eliciting requirements in the requirements phase of the design process. As described in further detail herein, the intelligent design platform receives an initial set of requirements from a designer. The digital assistant processes the initial set of requirements to provide a set of requirements that is more complete and/or more precise than the initial set of requirements. For example, one or more additional requirements that are not included in the initial set of requirements can be provided using the digital assistant (referred to as completeness). As another example, one or more requirements already provided within the initial set of requirements can be improved by adding information using the digital assistant (referred to as precision). The intelligent design platform generates one or more product designs based on a set of requirements that includes, among other requirements, one or more of a requirement of the initial set of requirements that has been improved (e.g., information added thereto) and/or an additional requirement that was not included in the initial set of requirements.

Figure 1:
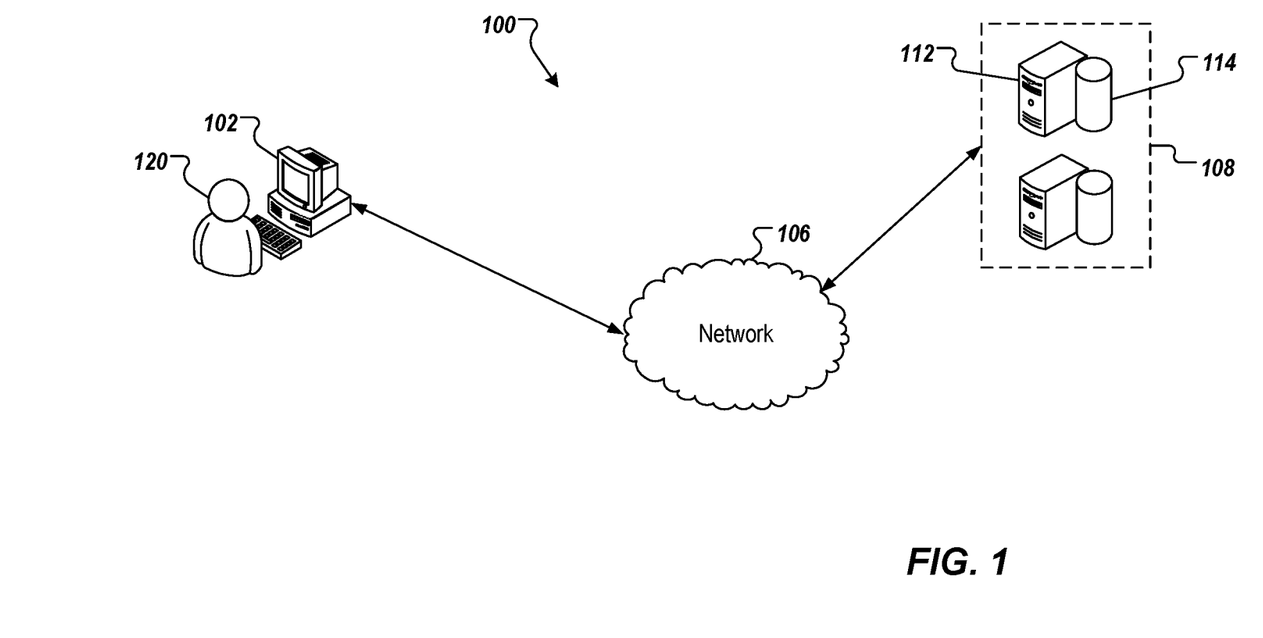
FIG. 1 depicts an example system that can execute implementations of the present disclosure.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link. For example, mobile computing devices, such as smartphones can utilize a cellular network to access the network 106.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host one or more applications that are provided as part of an intelligent design platform in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the context of the present disclosure, a user 120 can use the computing device 102 to interact with the intelligent design platform hosted on the back-end system 108. For example, the user 120 can input a set of designer-provided requirements (e.g., recorded in one or more design documents), referred to herein as an initial set of requirements, that are processed by the intelligent design platform to provide one or more product designs, as described in detail herein.

Implementations of the present disclosure are described in further detail herein with reference to an example product that is to be designed using the intelligent design platform. It is contemplated, however, that implementations of the present disclosure can be realized with any appropriate product. The example product includes a cup (e.g., a cup that can be designed to contain various types of liquids across a range of temperatures). Example designer-provided requirements for a cup can include, without limitation, a size (e.g., dimensions envelope), a weight (e.g., dry weight range), a capacity (e.g., fluid volume), materials, and temperature capacity (e.g., 0° C. to 82° C.). For example, the designer-provided requirements can be included in an initial set of requirements included in one or more design documents. In some examples, one or more of the designer-provided requirements are based on the designer's personal knowledge and/or experience. For example, the weight requirement can be provided based on the designer's personal knowledge that cups should be less than a particular weight (e.g., for cost-effective shipment, for ability of users to hold and manipulate the cup during use).

As another example, user-provided requirements can include qualitative descriptions that can be tied to a deterministic metric. For example, a requirement of "the cup must be sturdy" can be tied to material strength, but fails to set a quantitative measure. In some examples, user-provided requirements can include qualitative descriptions that do not tie to any deterministic metric. For example, "the cup must look classic" this relates to an overall aesthetic that does not have a universal definition, but still conveys information on the to-be-designed product.

Figure 2:
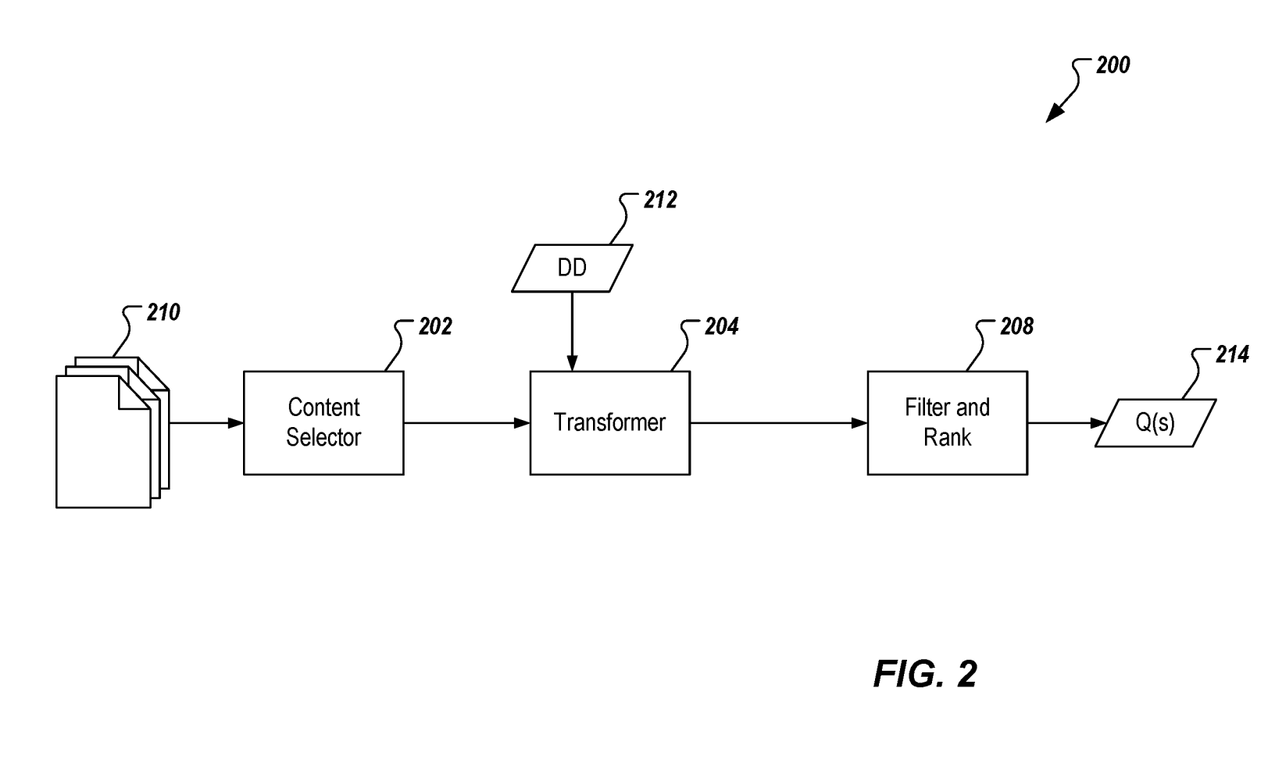
FIG. 2 depicts a block diagram of an example conceptual architecture for a design assistant to elicit requirements within an intelligent design platform in accordance with implementations of the present disclosure.

FIG. 2 depicts a block diagram of an example conceptual architecture 200 for a design assistant to elicit requirements within an intelligent design platform in accordance with implementations of the present disclosure. The example conceptual architecture 200 includes a content selector 202, a transformer 204, and a filter and rank module 208. In some examples, each of the content selector 202, the transformer 204, and the filter and rank module 208. are provided as one or more computer-executable programs that are each executed by one or more computing devices. As described in further detail herein, a set of design documents 210 and one or more design dimensions (DD) 212 are processed to provide a set of questions 214.

In some examples, the set of design documents 210 includes one or more design documents that provide information on a product that is to be designed, as described in further detail herein. In some examples, each design dimension 212 can include an aspect of a design to be considered in a question that can be proposed to the designer(s) to elicit answers that enable refinement of a requirement and/or addition of a requirement. Examples of the design dimension(s) 212 can include, without limitation, safety, compressive strength, renewability, sustainability, and customizability. In some examples, the set of questions 214 includes one or more questions that are to be posed to a designer to elicit requirements. In some examples, eliciting requirements can include determining additional requirements to include in the initial set of requirements and/or determining more precise information regarding a requirement already included in the initial set of requirements.

In further detail, each design document in the set of design documents 210 provides information on a product that is to be designed (e.g., a to-be-designed product). Example information can include, without limitation, a purpose description, a scope description, requirements, a testing description, and the like. In some examples, and as described in further detail herein, information included in the purpose description, the scope description, and/or the testing description can be used to elicit requirements, as well as the requirements themselves.

In some examples, the initial set of requirements can be described as designer-provided requirements. That is, the initial set of requirements includes requirements that are defined by the designer(s) and are provided in the set of design documents 210. In some examples, the requirements included in the set of design documents 210 provide the initial set of requirements that is used as a starting point for eliciting requirements using the design assistant of the present disclosure. By way of non-limiting example, and with reference to the example product of a cup, introduced above, an example initial set of requirements can include:

Cup should be configured such that it can be held with one hand.
Weight should be no more than 16 ounces.
Capacity of at least 24 fl. oz.
Comfortable to hold with contents.
Have a modern design.

In general, a requirement can be of a type of requirement. Example types of requirements can include functional requirements and non-functional requirements. With reference to the example above, and without limitation, [Have a modern design] can be considered a non-functional requirement, and [Capacity of at least 24 fl. oz.] can be considered a functional requirement. In some examples, each requirement can be associated with a specificity. In some examples, specificity can range between abstract and specific. With reference to the example above, [Have a modern design] can be considered abstract, and [Capacity of at least 24 fl. oz.] can be considered specific. In some examples, specificity of a requirement can be determined based on a knowledge graph, described in further detail herein.

In some examples, the content selector 202 processes the set of design documents to identify a set of content therein. In some examples, content of the set of content include features of the to-be-designed product and/or use cases of the to-be-designed product. In some examples, features and/or use cases of the product can be provided from one or more portions of a design document. For example, one or more features and/or one or more use cases can be determined from the purpose description, the scope description, the requirements, and/or the testing description. Continuing with the examples above, the content selector 202 can process the set of design documents to determine that the to-be-designed product is a cup that includes features of [reuse, sustainable] (e.g., determined from the purpose description and/or the score description), includes the features of [weight ≤16 oz., capacity ≥24 fl. oz.] (e.g., determined from the requirements), and includes the use case of [drinks] (e.g., determined from the purpose description and/or the score description).

In some implementations, the content selector 202 includes one or more processing modules that process the set of design documents. Example processing modules can include, without limitation, a natural language processing (NLP) module, and a machine learning (ML) module. For example, the NLP module can process text within the set of design documents using known NLP techniques to output a set of content (e.g., one or more features and/or one or more use cases). As another example, the ML module can process text and/or images within the set of design documents through one or more ML models to output a set of content (e.g., one or more features and/or one or more use cases). In some examples, each ML model is trained to generate at least a portion of content that is included in the set of content.

In general, each ML model is iteratively trained, where, at each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted, and another iteration of training is performed. In some instances, this process is repeated until the loss value meets the expected value.

In accordance with implementations of the present disclosure, content selected from the set of design documents is provided to the transformer 204. In some implementations, the transformer 204 processes the content and the design dimension(s) 212 to generate a set of queries. In some examples, a designer can specify the design dimension(s) 212 that the digital assistant is to consider in eliciting requirements. For example, the designer could prompt the system with the design dimension of sustainability of the cup design. In response, the design assistant processes the design dimension and applies the design dimension to content. In some examples, a set of design dimensions can be provided and prioritized, such that one design dimension is considered before another design dimension (e.g., cost of manufacturing can be considered before aesthetics). In some examples, one or more design dimensions can be automatically provided by the design assistant. For example, the design assistant can process the provided content, generate example questions based on a number of pre-set design dimensions, and choose design dimensions where the questions generated were of high-value or quality, described in further detail herein.

In some examples, each query in the set of queries is generated based on a domain-specific query language, where the domain is of the to-be-designed product. For example, and continuing with the example above, the domain can be provided as [cups]. In some examples, each query can be described as a set of analogies (e.g., A is to B as C is to [what]?). In some implementations, a query is generated based on a design dimension and content. In some examples, one or more ML models receive the design dimension and content as input and provides one or more queries as output. For example, a ML model can be trained to generate queries in response to design dimensions and content. The ML model can be trained on general language (e.g., large amounts of text not necessarily specific to design). In some examples, the ML model is trained by processing training data that includes example questions corresponding to example design dimension(s), example content, and the general understanding of language.

In some implementations, the transformer 204 processes the set of queries to generate a first set of questions, referred to herein as a set of unfiltered elicitation questions (uEQs). In some examples, the transformer 204 processes the set of queries based on information provided from the knowledge graph, introduced above, and described in further detail herein. Each question in the first set of questions is provided as a coherent, human-understandable question. In some examples, the transformer 204 executes NLP to generate the first set of question. In some examples, questions in the first set of questions are provided based on one or more queries in the set of queries. That is, and in some examples, not every query in the set of queries results in a question in the first set of questions.

For example, the transformer 204 can include a ML model that receives input and processes the input to provide the first set of questions as output. In some examples, the input includes the set of queries and information of the knowledge graph. In some examples, the ML model is a domain-specific model that is trained to provide a prediction (e.g., output including the first set of questions) based on an input.

In some examples, the transformer 204 identifies instances in the initial set of requirements, where more specificity is to be elicited, where subjective criteria are to be elicited in view of an objective requirement, and/or where a requirement is missing from the initial set of requirements. Continuing with the example above, the transformer 204 can determine that material is absent from the initial set of requirements (e.g., sets of requirements for cups typically include material, but material is absent from the initial set of requirements), and that [modern design] is subjective. Consequently, the first set of questions can include a question to elicit material and a question to elicit a description of [modern design].

Continuing with the example of a cup introduced above, content is the cup and initial requirements and a design dimension can be provided as sustainability. The design assistant uses the design dimension ("sustainability") to apply transformations to the content. For example, one of the requirements referred to previously is that the cup must be held with one hand. The design assistant "knows," through its general understanding of language, that "sustainable" products are often associated with minimal material usage, and it further "knows" that cups that can be held with one hand often have one handle. The design assistant can combine the design dimension and the content to generate the question: "Will removing the handle from the cup lead to less material use while still being greppable with one hand?"

In accordance with implementations of the present disclosure, the filter and rank module 208 receives the first set of questions and processes the first set of questions to provide a second set of questions, referred to herein as a set of filtered elicitation questions (fEQs). In some examples, at least a portion of the second set of questions is output by the design assistant as the set of questions 214. In further detail, not all of the questions in the first set of questions may be of particular relevance. Consequently, one or more questions can be filtered from the first set of questions to provide the second set of questions (e.g., the second set of questions is a sub-set of the first set of questions). In this manner, questions in the second set of questions are appropriate for the given context (e.g., provided from the set of design documents as a whole, and degree of progress in the requirements phase).

In some implementations, filtering can be based on a level of specificity relative to a degree of progress in the requirements phase. For example, early in determining the requirements, more general questions should be asked, while specificity can increase as the requirements phase progresses. For example, at the outset of eliciting requirements (e.g., a first iteration of the design assistant providing questions) exact engineering tolerances (e.g., on wall thickness of cup, dimensions of handles) are too specific. Consequently, any questions in the first set of questions that are above a threshold degree of specificity can be filtered from the first set of questions.

In some examples, the degree of specificity can be determined based on the knowledge graph, introduced above and described in further detail herein. For example, the knowledge graph provides a graph of entities that are related to one another and, in some cases, a first entity is an abstraction of a second entity. For example, an entity [cup] can be a general entity (or concept) in terms of specificity, an entity [handle] can be a higher-level entity (or concept) in terms of specificity, an entity [dimensions] can be next higher-level in terms of specificity, an entity [thickness] can be a next higher-level entity in terms of specificity, and an entity [tolerance] can be a next higher-level entity in terms of specificity. That is, in this non-limiting example, [cup] is the highest level of abstraction relative to [handle], [dimensions], [thickness], and [tolerance], which are increasingly more specific, where [tolerances] is more the most specific. As another non-limiting example, [vessel] can be the highest level of abstraction and [cup] is more specific than [vessel].

In some examples, specificity can be defined in terms of a degree of separation between entities (or concepts). In some examples, the degree of separation can be defined in terms of hops between entities (or concepts) in the knowledge graph. Continuing with the non-limiting example above, the knowledge graph can provide [cup]-[handle]-[dimensions]-[thickness]-[tolerance], where [handle] is one-degree of separation from [cup] (e.g., one-hop from [cup] to [handle] in the knowledge graph), and [tolerance] is four-degrees of separation from [cup] (e.g., four-hops from [cup] to [tolerance] in the knowledge graph). Continuing with this example, a threshold degree of separation can include less than two-degrees of separation. Consequently, if the first set of questions includes a first question associated with [handle] (e.g., [How many handles should the cup have?]), a second question associated with [dimensions] (e.g., [What are the dimensions of the handle?]), third question associated with thickness (e.g., [What is the thickness of the handle?]), and a fourth question associated with [tolerance] (e.g., [What is the tolerance range for the thickness of the handle?]), the second question, the third question, and the fourth question would all be filtered and absent from the second set of questions, while the first question would be included in the second set of questions.

In some implementations, filtering can be performed based on general quality of a question. In some examples, general quality can be determined based on relevance or redundancy in view of the overall context and/or content of the set of design documents. For example, if a question is determined to be redundant in terms of requirements already included in the set of initial requirements, the question can be filtered. For example, a question in the first set of questions can include [How many handles?]. However, although not in the requirements of the design document, another portion of the design document (e.g., the scope description) can provide that [The cup will include at least one handle to enable easy grasping and lifting]. Consequently, it can be determined that the question is redundant and the question is filtered. As another example, a question in the first set of questions can include [Can the cup be made from stainless steel?] (e.g., in response to the requirement of [modern design] and/or absence of a material identified in the requirements). However, although not in the requirements of the design document, another portion of the design document (e.g., the scope description) can provide that [The cup is to be reusable and sustainable]. It can be determined that stainless steel is not classified as a sustainable material (e.g., from the knowledge graph). Consequently, the question does not make sense in terms of the design as a whole and is filtered from the first set of questions.

In some implementations, the filter and rank module 208 can rank questions in the second set of questions to determine which questions are to be posed to the designer(s). In some examples, each question in the second set of questions is associated with a utility score that represents a utility of the respective question to the designer(s) at the current iteration of the requirements stage. For example, a question may be more useful at a later stage in development of the requirements than an earlier stage. Consequently, a utility score of the question is higher at the later stage than the utility score of the (same) question at an earlier stage.

In some implementations, a utility score is provided as a single number assigned to a question meant to rate a relative usefulness of the question to the designer(s) at the specific point in the design process currently. As such, the utility score takes into account the designers' context as well as the intrinsic quality of the question. In some examples, quality (as reflected in the utility score) can account for: how grammatically coherent the question is, how accurate the question displays an understanding of the context (e.g., a poor understanding of the cup's context would be the question "Should it be made of paper?" (while paper cups exist, the question displays a lack of understanding about the design context—a reusable cup), how accurately the question addresses the design dimension(s) (e.g., do not ask questions about the durability of the cup, if the design dimension is sustainability), and whether the question is repetitive.

In some implementations, questions in the second set of questions are ranked based on respective utility scores. For example, a first question can have a first utility score and a second question can have a second utility score, the second utility score being greater than the first utility score. Consequently, the second question can be ranked higher than the first question. By ranking questions based on utility scores, an order of posing questions can be defined, in which a higher ranked question is posed to the design(s) before a lower ranked question. For example, and using the example above, the second question is posed to the designer(s) before the first question. In some implementations, only questions having a utility score that meets (e.g., is equal to or greater than) a threshold utility score are posed to the designer(s). In this manner, the population of questions posed to the designer(s) can be controlled to prevent overloading the designer(s) with questions.

As introduced above, the design assistant can provide multiple iterations of providing questions to the designer(s) to elicit requirements. For example, in a first iteration, the design assistant can pose questions that are relatively general in nature, and in a second iteration, the design assistant can pose questions that are more specific. That is, for example, with each iteration, a specificity of the questions can be increased. In some implementations, a terminus is provided to cease posing of questions by the design assistant. An example terminus can be a manual terminus, a pre-defined terminus, and a dynamic terminus. For example, and with regard to the manual terminus, a designer can provide input to the design assistant indicating that posing of questions is to cease. As another example, and with regard to a pre-defined terminus, a threshold number of iterations is provided, and posing of questions ceases when the iterations meet the threshold number of iterations (e.g., three iterations then posing of questions ceases). As another example, and with regard to a dynamic terminus, one or more parameters of filtering can be enhanced after each iteration, such that questions are increasingly more filtered from the first set of questions, ultimately resulting in all questions being filtered from the first set of questions, such that the second set of questions is empty, and posing of questions ceases. As another example, and with regard to a dynamic terminus, the utility score threshold can increase after each iteration, such that eventually, no questions in the second set of questions has a utility score that meets the threshold utility score, and posing of questions ceases.

As introduced above, the design assistant of the present disclosure leverages one or more knowledge graphs to provide the questions to elicit requirements. In general, a knowledge graph can be described as a knowledge base that can be queried to provide query results. In general, a knowledge graph is a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a product Alpha, a node B represents a material Beta, and an edge E is associated with the relationship "is made of," then having the edge E connect the nodes in the direction from node A to node B in the graph represents the fact that Alpha is made of Beta. In some examples, the knowledge graph can be enlarged with schema-related knowledge (e.g., Alpha is a concept Product, Beta is a concept Material, and "is made of" is a property or relationship between two entities/instances of concept Person and concept Material). Adding schema-related information supports evaluation of reasoning results. A knowledge graph can be represented by any of a variety of physical data structures. For example, a knowledge graph can be represented by triples that each represent two entities in order, and a relationship from the first to the second entity; for example, [alpha, beta, is made of], or [alpha, is made of, beta], are alternative ways of representing the same fact. Each entity and each relationship can be, and generally will be, included in multiple triples.

Figure 3:
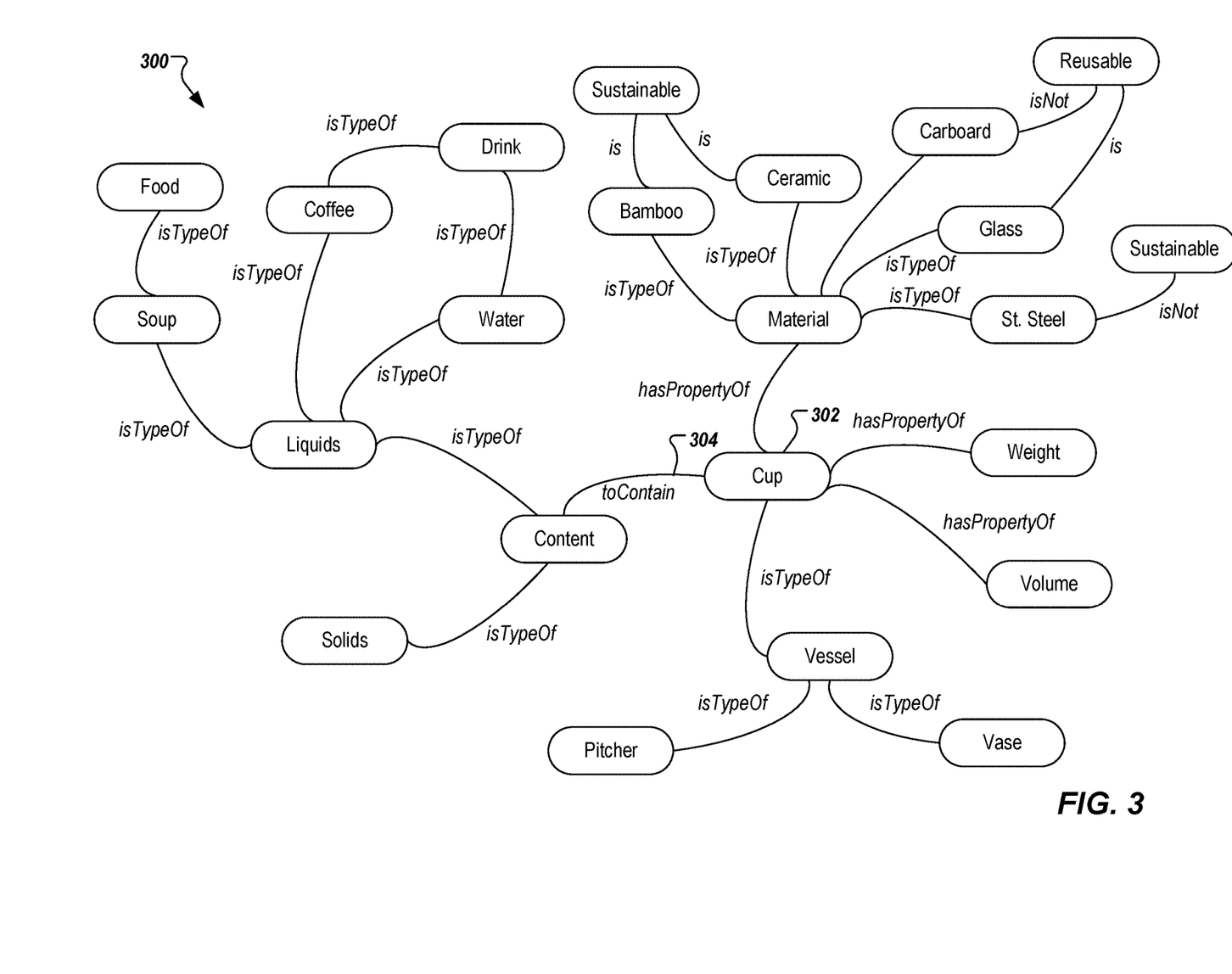
FIG. 3 depicts an example portion of a knowledge graph in accordance with implementations of the present disclosure.

FIG. 3 depicts an example portion 300 of a knowledge graph in accordance with implementations of the present disclosure. In the example of FIG. 3, the example portion 300 (as well as the knowledge graph as a whole) is depicted as a graph of nodes 302 and edges 304 between nodes, where each node 302 represents an entity (or concept) and each edge 304 represents a relationship between nodes 302 (i.e., a relationship between entities represented by the respective nodes 302).

In some examples, the knowledge graph can be provided based on a general knowledge graph and a domain-specific knowledge graph. For example, a general knowledge graph can record entities and relationships between entities for multiple domains. In some examples, the general knowledge graph can record general (or more abstract) entities and relationships between entities for any particular domain. In contrast, a domain-specific knowledge graph can record entities and relationships between entities for a specific domain (e.g., [vessels]). That is, the domain-specific knowledge graph can record more specific entities and relationships between entities for the specific domain.

In some examples, the knowledge graph leverage by the design assistant of the present disclosure is generated by merging the general knowledge graph and the domain-specific knowledge graph. For example, merging of the general knowledge graph and the domain-specific knowledge graph can result in a knowledge graph that includes the entirety of the domain-specific knowledge graph and a portion of the general knowledge graph. Using FIG. 3 as a non-limiting example, the entities [Vessel], [Pitcher], [Vase], [Solids], [Liquids], [Soup], [Food], [Coffee], [Water], and [Drink], and relationships therebetween, are each provided from the general knowledge graph, while the remaining entities and relationships between entities of FIG. 3 are provided in the domain-specific knowledge graph.

Figure 4A:
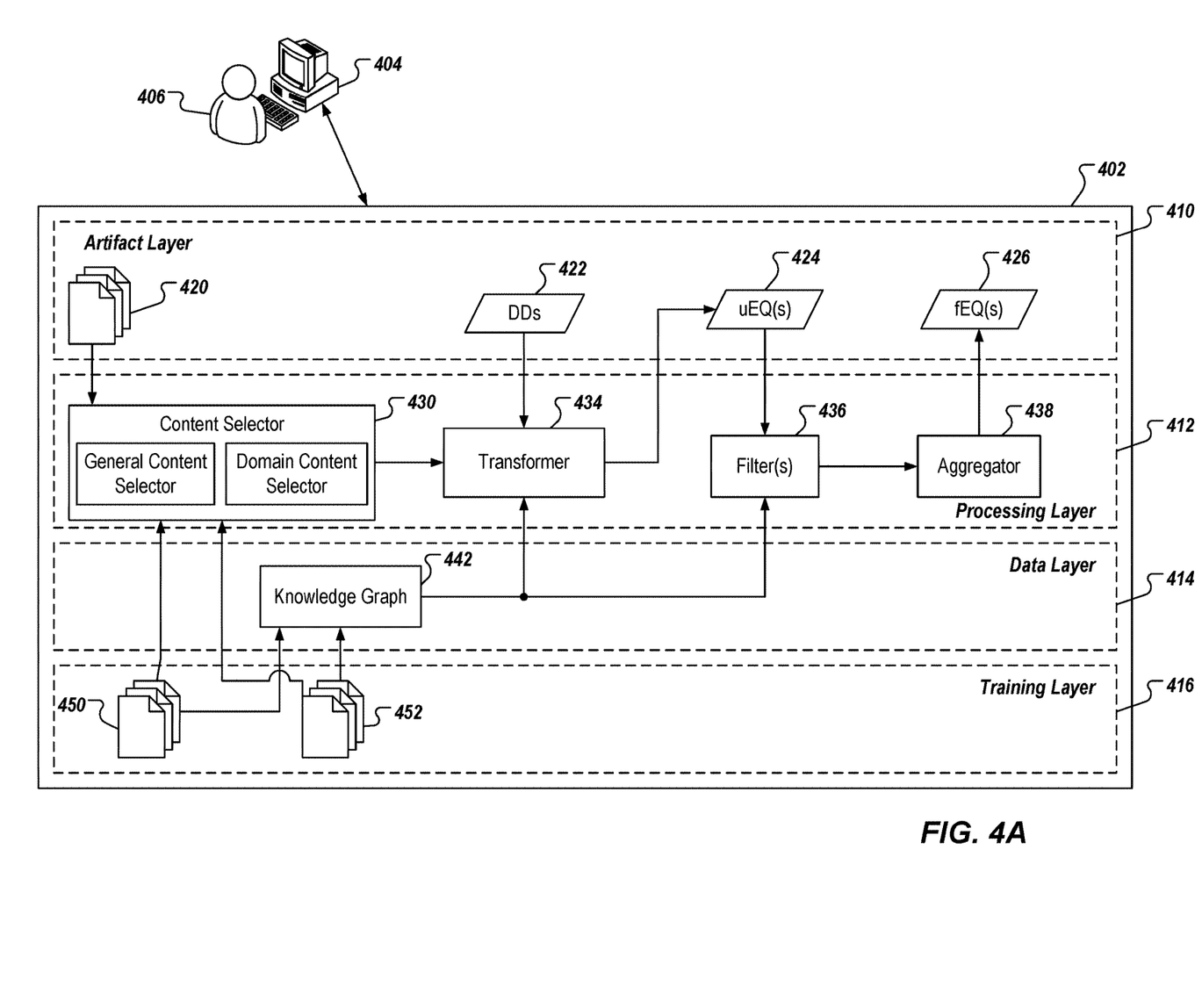
FIGS. 4A and 4B depict block diagrams detailing the design assistant for eliciting requirements within an intelligent design platform in accordance with implementations of the present disclosure.
Figure 4B:
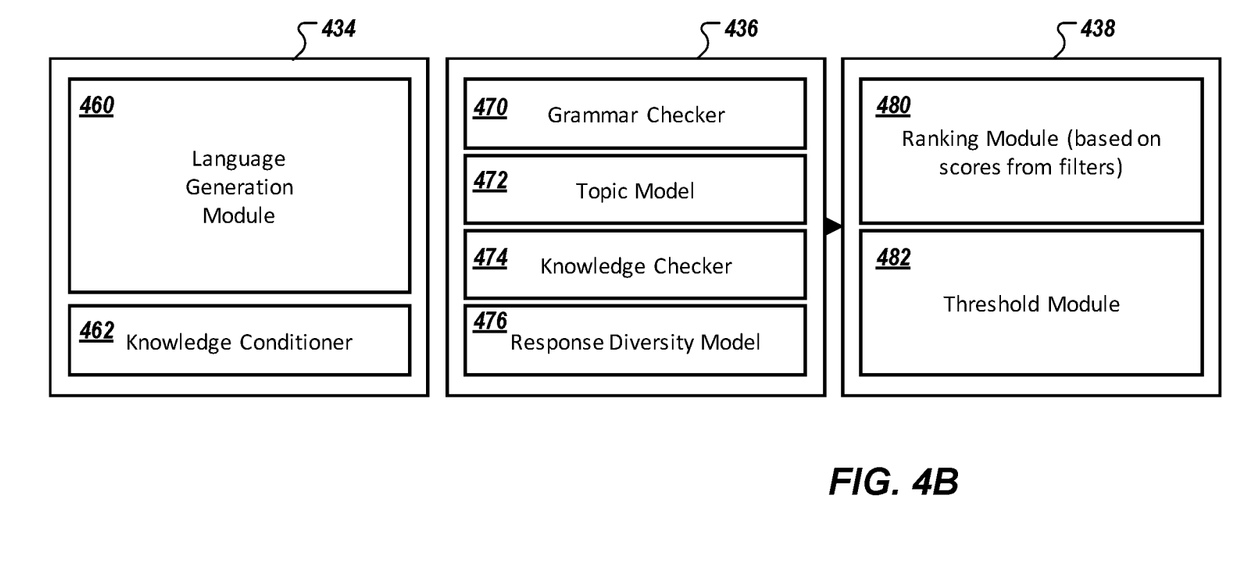

FIGS. 4A and 4B depict block diagrams detailing a design assistant 402 for eliciting requirements within an intelligent design platform in accordance with implementations of the present disclosure. In some examples, the design assistant 402 is provided as part of an intelligent design platform hosted on one or more computing devices (e.g., the back-end system 108 of FIG. 1). In some examples, a computing device 404 enables a user 406 (e.g., a designer) to interact with the design assistant 402 (e.g., over the network 106 of FIG. 1).

In some examples, a presentation layer (not shown in FIG. 4A or 4B) is provided, which enables the user 406 to interact with the design assistant 402. For example, one or more user interfaces (UIs) can be provided through the computing device 404. In some examples, the one or more UIs can include, without limitation, graphical UIs and/or audible UIs. For example, a UI can include a page (e.g., web page, application page) that graphically depicts UI elements (e.g., text boxes, dialogue boxes, buttons, check boxes) that enable the user 406 to use the computing device 404 to provide information to the design assistant 402. In some examples, the page can provide graphical representations of one or more elicitation questions (e.g., the set of questions 214 of FIG. 2). In some examples, the page can include a dialogue box that enables the user 406 to input one or more answers to questions in the set of questions. It is contemplated, however, that implementations of the present disclosure can be realized using any appropriate presentation channels (e.g., chatbot with visual and/or audible functionality).

With particular reference to FIG. 4A, the design assistant 402 includes an artifact layer 410, a processing layer 412, a data layer 414, and a training layer 416. In some examples, the artifact layer 410 includes a set of design documents 420, a set of design dimensions (DDs) 422, a first set of elicitation questions 424 (uEQs), and a second set of elicitation questions 426 (fEQs). In some examples, the processing layer 412 includes a content selector 430, a transformer 434, a filter module 436, and an aggregator module 438. In some examples, the data layer 414 includes a knowledge graph 442. In some examples, the training layer 416 includes a set of general documents 450 and a set of domain-specific documents 452.

In some implementations, the set of design documents 420 includes one or more design documents, each design document in the set of design documents 420 providing information on a product that is to be designed (e.g., a to-be-designed product). For example, the design documents included in the set of design documents 420 can include design documents as described above with reference to the set of design documents 210 of FIG. 2. In some examples, the set of design documents 420 is provided to the design assistant 402. For example, the user 406 can use the computing device 404 to upload the set of design documents to the design assistant 402, or inform the design assistant 402 of a location of the set of design documents 420 to enable the design assistant 402 to retrieve the set of design documents 420.

In some implementations, one or more design documents in the set of design documents 420 are processed by the content selector 430. In some examples, the content selector 430 processes a design document through one or more ML models, which provides content and/or the initial set of requirements as output. In some examples, the one or more ML models are trained based on training data provided from the set of general documents 450 and/or the set of domain-specific documents 452. In the depicted example, the content selector 430 can include a general content selector and a domain content selector. In some examples, the general content selector 430 selects content that is general and not domain-specific. For example, and continuing with the examples used herein, the general content selector can select [reusable, sustainable] from the scope description. As another example, and continuing with the examples used herein, the domain-specific content selector can select [drinks] from the scope description, and the example requirements listed above from the requirements as the initial set of requirements.

In some examples, the transformer 434 receives the initial set of requirements and content from the content selector 430, and receives the set of example questions based on the design dimensions 422. The transformer 434 processes each to provide the first set of questions 424 (e.g., as described above with reference to the transformer 206 of FIG. 2). In some examples, and as discussed above, the transformer 434 can include one or more ML models that are trained using example questions and content. In some examples, the first set of questions is provided as input for filtering and ranking, as described herein. For example, the filter module 436 and the aggregator module 438 perform the filter and ranking functionality, as described herein (e.g., the filter module 436 and the aggregator module 438 of FIG. 4A can be included in the filer and rank module 208 of FIG. 2). Ultimately, the second set of questions 426 is provided as output.

FIG. 4B depicts further detail of each of the transformer 434, the filter module 436, and the aggregator module 438. In the depicted example, the transformer 434 includes a language generation module 460 and a knowledge conditioner 462, the filter module 436 includes a grammar checker 470, a topic model 472, a knowledge checker 474, and a response diversity model 476 and the aggregator 438 includes a ranking module 480 and a threshold module 482.

In some examples, the language generation module 460 is provided as a transformer portion of the transformer 434, which receives the context and product information and generates the questions. In some examples, the knowledge conditioner 462 is a hook into the knowledge graph 442, which can use the product as an input query to the knowledge graph 442 to retrieve product attributes and knowledge about the product that is encapsulated within the knowledge graph 442. For example, and continuing with the example above, the knowledge conditioner 462 can query the knowledge graph 442 with [cup], which returns a portion (e.g., as one or more tables) that represents attributes and knowledge of cups (e.g., the example portion 300 of FIG. 3 in computer-readable, tabular form). As described herein, the transformer 434 (e.g., the language generator module 460) can generate the first set of questions based on the information received from the knowledge graph 442 through the knowledge conditioner 462.

In some implementations, the filter module 436 generates a utility score for each question in the first set of questions, as described herein. In some examples, the grammar checker 470 generates a grammar score that represents a grammatical correctness of a question. For example, the grammar checker 470 processes the question to verify text for grammatical correctness. The more grammatically correct the question is, the higher the score. For example, the grammar score is inversely related to a number of grammatical errors within the questions. In some examples, the topic model 472 generates a topic score that represents how relevant a question is to a topic. In the context of the present disclosure, the topic can include, without limitation, a design dimension. The topic score can be generated based on the words used in the question and a semantic overlap between the words and the topic (e.g., the topic score being directly related to the amount of semantic overlap). In some examples, the knowledge checker 474 can execute a heuristic to evaluate whether the question contains something that is known (e.g., from the knowledge graph 434). For example, the knowledge checker 474 generates a knowledge score that represents whether knowledge (e.g., facts, items) within a question is known. For example, a question can be generated, which includes information that is not real and/or is otherwise unknown from the knowledge graph. In some examples, the response diversity model 476 generates a redundancy score based on a relative redundancy of the question in view of other questions. In some examples, the redundancy score can be determined based on comparing questions. For example, a set of questions can be provided as input to a ML model, which provides a redundancy score for each question relative to one another.

In some implementations, the filter module 436 generates a utility score as a combination of the grammar score, the topic score, the knowledge score, and the redundancy score. In some examples, the utility score can be provided as any appropriate combination of the scores. Example combinations include, without limitation, a sum of the scores, an average of the scores, a weighted sum of the scores, and a weighted average of the scores.

In some examples, the ranking module 480 receives a set of questions from the filter module 436, each of the questions having an associated utility score, as described herein. In some examples, the ranking module 480 puts the questions in rank order based on utility score, as described herein. In some examples, the threshold module provides a utility score threshold for determining which questions are to be provided as output as the second set of questions 426. That is, only questions having a utility score that meets the threshold utility score are included in the second set of questions 426. In some examples, the threshold module 482 adjusts the threshold utility score between iterations of eliciting requirements. For example, in a first iteration, the threshold utility score can be a first value, and in a second iteration (after the first iteration), the threshold utility score can be a second value, where the second value is greater than the first value. In this manner, the design assistant is more stringent in identifying questions to be provided as output as the iterations progress (e.g., eventually reaching a terminus in a dynamic terminus scenario).

In some implementations, at least a portion of the second set of questions is provided as output to the user 406 at the presentation layer (e.g., through the computing device 404). For example, and as described in further detail herein, questions of the second set of questions can be presented to the user 406 to prompt responses. In some examples, the user 406 provides one or more responses to the questions (e.g., answers some of the questions, answers all of the questions). The responses that are received are used to provide the set of requirements. For example, and continuing with the examples above, the following example questions, among other potential questions, can be posed to the user 406:

What material should the cup be made of?
Is comfort in terms of temperature and/or another parameter?
What are some adjectives that described "modern design"?

Example responses to the questions can include [bamboo], [temperature], [industrial, minimal], respectively. The design assistant can processes the responses to provide the set of requirements from the initial set of requirements based on the responses. For example, and continuing with the example initial set of requirements above, the set of requirements can be provided as:

Cup should be configured such that it can be held with one hand.
Cup should be made from bamboo.
Weight should be no more than 16 ounces.
Capacity of at least 24 fl. oz.
Comfortable to hold with contents in terms of temperature.
Have a modern design—industrial, minimal.

In some implementations, and as introduced above, another iteration of eliciting requirements can be executed by the design assistant to further enhance the set of requirements that are ultimately to be used in the design process. In some examples, the set of requirements resulting from an iteration are provided as the initial set of requirements for the next iteration. For example, the example set of requirements provided above can be provided as the initial set of requirements for a next iteration of eliciting requirements (e.g., where example questions could include [What temperature range will the contents of the cup be within?], which could elicit a response (and requirement) of 0° C. to 82° C.).

FIG. 5 depicts an requirements elicitation in accordance with implementations of the present disclosure. In the example of FIG. 5, a portion of a design document 500 and a questions interface 502 are depicted. The design document 500 can be included in the set of design documents (e.g., the set of design documents 210 of FIG. 2) that is processed to determine the set of questions to be posed to the designer(s) (e.g., the set of fEQs). For example, the design document 500 can be processed to identify content 506, 508 (e.g., by the content selector 202 of FIG. 2) and an initial set of requirements 510. The example of FIG. 5 is consistent with the examples described herein in terms of the to-be-designed product being a cup. In the example of FIG. 5, the questions interface 502 graphically depicts questions of the set of fEQs that are posed to the designer(s). In the depicted example, each question is associated with a text box that the designer(s) can use to input an answer. The question interface 502 includes a submit button that enables the designer(s) to submit the answers to the design assistant. Although FIG. 5 depicts a graphical interface for conversing with the designer(s), as introduced above, the design assistant of the present disclosure can use any appropriate channel for communicating with the designer(s) (e.g., audible and/or visual channels, chatbot).

Figure 6:
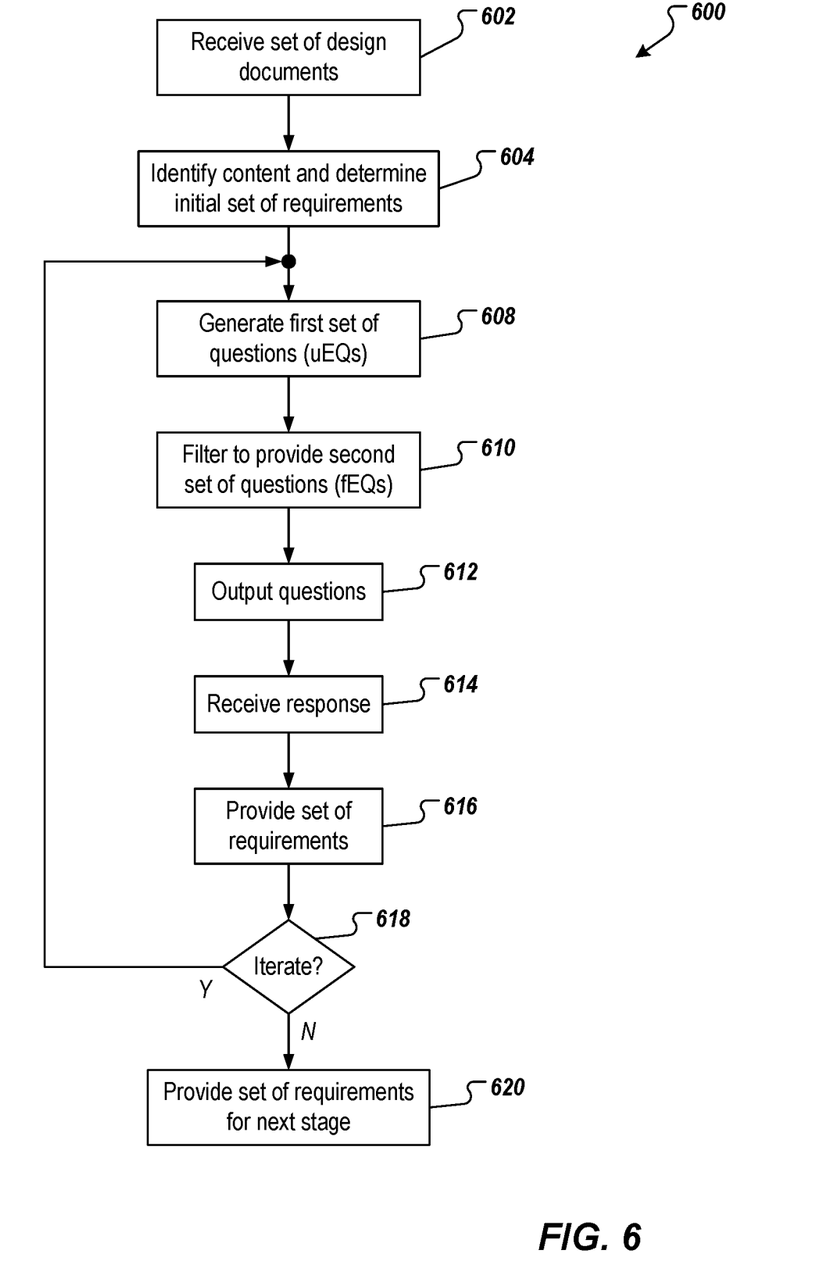
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices.

A set of design documents is received (602). For example, and as described herein, the design assistant receives a set of design documents (e.g., the set of design documents 210 of FIG. 2), which includes one or more design documents that provide information on a product that is to be designed. Content is identified and an initial set of requirements is determined (604). For example, and as described herein, the content selector 202 processes the set of design documents to identify a set of content therein, where features and/or use cases of the product can be provided from one or more portions of a design document. For example, one or more features and/or one or more use cases can be determined from the purpose description, the scope description, the requirements, and/or the testing description. In some implementations, the content selector 202 includes one or more processing modules that process the set of design documents.

A first set of questions is generated (608). For example, and as described herein, the transformer 204 processes the content and design dimensions 212 to provide the first set of questions. In some examples, and as discussed above, the transformer 204 can include one or more ML models that are trained using example questions and content. A second set of questions is provided (610). For example, and as described herein, the filter and rank module 208 receives the first set of questions and processes the first set of questions to provide a second set of questions, referred to herein as a set of filtered elicitation questions (fEQs). In some examples, at least a portion of the second set of questions is output by the design assistant as the set of questions 214. A set of questions is output (612). For example, and as described in detail herein, each question in the second set of questions is associated with a utility score that represents a utility of the respective question to the designer(s) at the current iteration of the requirements stage, where questions in the second set of questions are ranked based on respective utility scores and only questions having a utility score that meets (e.g., is equal to or greater than) a threshold utility score are posed to the designer(s).

One or more responses are received (614) and a set of requirements is provided (616). For example, and as described herein, questions of the second set of questions can be presented to the user to prompt responses. In some examples, the user provides one or more responses to the questions (e.g., answers some of the questions, answers all of the questions). The responses that are received are used to provide the set of requirements.

It is determined whether another iteration to elicit requirements is to be executed (618). For example, and as described herein, the design assistant of the present disclosure can provide multiple iterations of providing questions to the designer(s) to elicit requirements. For example, in a first iteration, the design assistant can pose questions that are relatively general in nature, and in a second iteration, the design assistant can pose questions that are more specific. That is, for example, with each iteration, a specificity of the questions can be increased. In some implementations, a terminus is provided to cease posing of questions by the design assistant. An example terminus can be a manual terminus, a pre-defined terminus, and a dynamic terminus. For example, and with regard to the manual terminus, a designer can provide input to the design assistant indicating that posing of questions is to cease. As another example, and with regard to a pre-defined terminus, a threshold number of iterations is provided, and posing of questions ceases when the iterations meet the threshold number of iterations (e.g., three iterations then posing of questions ceases). As another example, and with regard to a dynamic terminus, one or more parameters of filtering can be enhanced after each iteration, such that questions are increasingly more filtered from the first set of questions, ultimately resulting in all questions being filtered from the first set of questions, such that the second set of questions is empty, and posing of questions ceases. As another example, and with regard to a dynamic terminus, the utility score threshold can increase after each iteration, such that eventually, no questions in the second set of questions has a utility score that meets the threshold utility score, and posing of questions ceases. The set of requirements is provided for a next stage in the design process (620). For example, the design assistant can output the set of requirements for processing in a next stage of the design process (e.g., generating a design that meets the requirements in the set of requirements).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer-implemented method for automatically eliciting requirements for a to-be-designed product by a design assistant in an intelligent design platform, the method comprising:
   receiving, by the design assistant, an initial set of requirements, each requirement in the initial set of requirements being manually provided by a user;
   providing, by the design assistant and using a knowledge graph, a first set of questions based on the initial set of requirements and content determined from at least one design document in a set of design documents;
   filtering, by the design assistant, one or more questions from the first set of questions to provide a second set of questions, filtering comprising comparing utility scores of respective questions in the first set of questions to a threshold utility score, and including one or more questions each having a utility score that meets the threshold utility score in the second set of question;
   providing, by the design assistant, at least a portion of the second set of questions as output to the user to elicit one or more responses from the user; and
   editing, by the design assistant, the initial set of requirements based on the one or more responses to provide a set of requirements, the set of requirements for the to-be-designed product.

2. The method of claim 1, further comprising receiving at least a portion of the knowledge graph in response to querying the knowledge graph using at least one query parameter associated with the to-be-designed product.

3. The method of claim 1, wherein each utility score is based on a respective sub-set of scores and represents an overall relevance of a respective question to the to-be-designed product and an iteration of requirements elicitation.

4. The method of claim 1, further comprising receiving a set of design dimensions comprising at least one design dimension, wherein the first set of questions is provided based on the set of design dimensions.

5. The method of claim 1, wherein multiple iterations of requirements elicitation are performed to provide the set of requirements.

6. The method of claim 1, further comprising receiving the set of design documents comprising at least one document that comprises content manually provided by the user, wherein requirements in the initial set of requirements are provided from the set of design documents.

7. A non-transitory computer-readable storage medium coupled to one or more processors and having instructions stored thereon which, when executed by the one or more processors, cause the one or more processors to perform operations for automatically eliciting requirements for a to-be-designed product by a design assistant in an intelligent design platform, the operations comprising:
   receiving, by the design assistant, an initial set of requirements, each requirement in the initial set of requirements being manually provided by a user;
   providing, by the design assistant and using a knowledge graph, a first set of questions based on the initial set of requirements and content determined from at least one design document in a set of design documents;
   filtering, by the design assistant, one or more questions from the first set of questions to provide a second set of questions, filtering comprising comparing utility scores of respective questions in the first set of questions to a threshold utility score, and including one or more questions each having a utility score that meets the threshold utility score in the second set of question;

providing, by the design assistant, at least a portion of the second set of questions as output to the user to elicit one or more responses from the user; and editing, by the design assistant, the initial set of requirements based on the one or more responses to provide a set of requirements, the set of requirements for the to-be-designed product.

8. The non-transitory computer-readable storage medium of claim 7, wherein operations further comprise receiving at least a portion of the knowledge graph in response to querying the knowledge graph using at least one query parameter associated with the to-be-designed product.

9. The non-transitory computer-readable storage medium of claim 7, wherein each utility score is based on a respective sub-set of scores and represents an overall relevance of a respective question to the to-be-designed product and an iteration of requirements elicitation.

10. The non-transitory computer-readable storage medium of claim 7, wherein operations further comprise receiving a set of design dimensions comprising at least one design dimension, wherein the first set of questions is provided based on the set of design dimensions.

11. The non-transitory computer-readable storage medium of claim 7, wherein multiple iterations of requirements elicitation are performed to provide the set of requirements.

12. The non-transitory computer-readable storage medium of claim 7, wherein operations further comprise receiving the set of design documents comprising at least one document that comprises content manually provided by the user, wherein requirements in the initial set of requirements are provided from the set of design documents.

13. A system, comprising:
a processor; and
a computer-readable storage device coupled to the processor and having instructions stored thereon which, when executed by the processor, cause the processor to perform operations for automatically eliciting requirements for a to-be-designed product by a design assistant in an intelligent design platform, the operations comprising:
receiving, by the design assistant, an initial set of requirements, each requirement in the initial set of requirements being manually provided by a user;
providing, by the design assistant and using a knowledge graph, a first set of questions based on the initial set of requirements and content determined from at least one design document in a set of design documents;
filtering, by the design assistant, one or more questions from the first set of questions to provide a second set of questions, filtering comprising comparing utility scores of respective questions in the first set of questions to a threshold utility score, and including one or more questions each having a utility score that meets the threshold utility score in the second set of question;
providing, by the design assistant, at least a portion of the second set of questions as output to the user to elicit one or more responses from the user; and
editing, by the design assistant, the initial set of requirements based on the one or more responses to provide a set of requirements, the set of requirements for the to-be-designed product.

14. The system of claim 13, wherein operations further comprise receiving at least a portion of the knowledge graph in response to querying the knowledge graph using at least one query parameter associated with the to-be-designed product.

15. The system of claim 13, wherein each utility score is based on a respective sub-set of scores and represents an overall relevance of a respective question to the to-be-designed product and an iteration of requirements elicitation.

16. The system of claim 13, wherein operations further comprise receiving a set of design dimensions comprising at least one design dimension, wherein the first set of questions is provided based on the set of design dimensions.

17. The system of claim 13, wherein multiple iterations of requirements elicitation are performed to provide the set of requirements.

18. The system of claim 13, wherein operations further comprise receiving the set of design documents comprising at least one document that comprises content manually provided by the user, wherein requirements in the initial set of requirements are provided from the set of design documents.

* * * * *